United States Patent [19]

Numasawa et al.

[11] 4,343,330
[45] Aug. 10, 1982

[54] POWER STEERING DEVICE

[75] Inventors: Akio Numasawa, Nagoya; Ryouhei Kizu, Toyota; Mitsuru Naka, Toyota; Nobuo Hiraiwa, Toyota, all of Japan

[73] Assignee: Toyota Jidosha Kogyo Kabushiki Kaisha, Toyota, Japan

[21] Appl. No.: 128,037

[22] Filed: Mar. 7, 1980

[51] Int. Cl.³ .................................................. F15B 9/00
[52] U.S. Cl. ................................ 137/625.48; 91/368; 91/375 A; 251/251
[58] Field of Search .............................. 91/368, 375 A; 137/625.48; 251/251, 252, 253, 254, 255

[56] References Cited

U.S. PATENT DOCUMENTS 1,722,401  7/1929  Todd ................................ 251/254
3,292,499  12/1966  Duffy ................................ 91/368
3,610,105  10/1971  Tomita ........................... 91/368 X Primary Examiner—Alan Cohan
Attorney, Agent, or Firm—Stevens, Davis, Miller & Mosher

[57] ABSTRACT

A power steering device comprising: an input and an output shafts connected to each other by a torsion bar in a manner to be relatively rotatable in the same direction; a valve spool concentrically disposed around said input shaft and axially movably provided; balls provided in first moving paths and engaged with said valve spool; and pins formed on said valve spool and engaged with second moving paths. Said first moving paths are given torsions at a certain angle with respect to said second moving paths. Said valve spool is axially moved in accordance with a relative rotation between said input and output shafts to change one oil channel over to the other.

6 Claims, 5 Drawing Figures

POWER STEERING DEVICE

BACKGROUND OF THE INVENTION

1. Field of the Invention

This invention relates to a power steering device used as auxiliary means for transmitting a steering force from a steering wheel to tires of a motor vehicle.

2. Prior Art

Heretofore, there have been generally used a recirculating ball type power steering device and a rack and pinion type power steering device.

As the rack and pinion type power steering device, such a construction has been proposed that a pawl provided on a rotatable, axially movable valve spool is engaged with a spiral groove and caused to axially slide along the spiral groove, whereby the valve spool is axially moved to change one oil channel over to the other. However, the abovedescribed device of the prior art has presented such disadvantages that the pawl is fixed onto the spool, and, it cannot be displaced, and therefore, unless the groove surface of the spiral groove is formed with high precision, the pawl cannot slide along the groove surface. On the other hand, if the interval between the groove surface and the pawl is made large to avoid the abovedescribed difficulty in sliding, then the responsiveness of the power steering device is deteriorated for the period of time required for absorbing the excessive clearance resulted from the interval.

SUMMARY OF THE INVENTION

The invention has been developed in view of the disadvantages of the prior art described hereinabove, and has as its object the provision of a power steering device capable of smoothly effecting the change-over of oil channels by a valve spool in proportion to a steering reaction torque.

In order to accomplish the abovedescribed object, the power steering device according to the present invention is characterized in that: an input and an output shafts rotatably set in a common axis in a valve housing are connected to each other through a torsion bar; a valve spool concentrically disposed around the input shaft and axially movably provided is engaged with balls set in first moving paths; further, pins provided on the output shaft and radially extending are engaged with second moving paths formed in the valve spool; and first moving paths are given torsions through a certain angle with respect to the second moving paths; and, when the input shaft and the output shaft make a relative rotation, the valve spool is axially moved to change an oil channel over to the other.

The abovementioned and other features and advantages of the invention will hereinafter be made evident in conjunction with the description of the presently preferred embodiment of the invention illustrated in the accompanying drawings.

DETAILED DESCRIPTION OF THE PREFERRED EMBODIMENT

Figure 1:
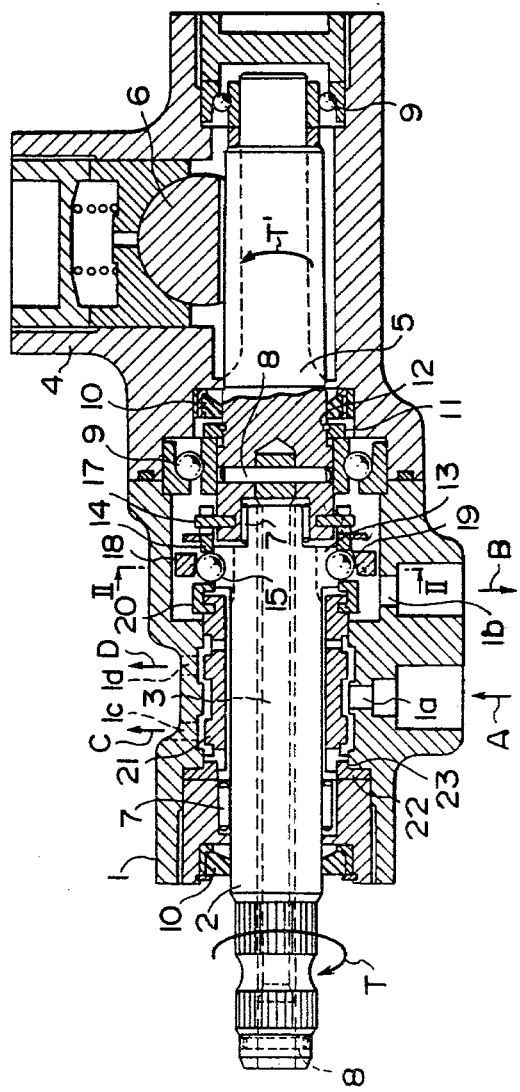
FIG. 1 is a sectional view showing an embodiment of the power steering device according to the present invention.

FIG. 1 is a sectional view showing an embodiment of the power steering device according to the invention. As apparent from FIG. 1, the power steering device according to the present embodiment is of a rack and pinion type, wherein a hollow main shaft 2 (input shaft) for steering is disposed in a valve housing 1, the main shaft 2, through a torsion bar 3 provided therein, is connected to a pinion shaft 5 (output shaft) in a pinion housing 4 in a manner to be rotatable in the same direction, and the pinion shaft 5 is meshed at pinions provided on the outer periphery thereof with a rack bar 6. The main shaft 2 is positioned by the torsion bar 3 which is fixed by two right and left needle bearings 7 and also two right and left pins 8. Furthermore, the pinion shaft 5 is positioned in the pinion housing 4 with no looseness through two right and left angular bearings 9.

The interior of the valve housing 1 is sealed by a seal ring 12 secured by seals 10, 10 and a spacer 11. Oil is fed into the valve housing 1 from a pump, not shown, through a pressure port 1a in a direction indicated by an arrow A, and a supply of oil is fed to a reservoir, not shown, from a return port 1b. Further, the oil channels in the valve housing 1 are communicated with cylinder chambers of cylinders through cylinder ports 1c and 1d as indicated by arrows C and D.

Figure 2:
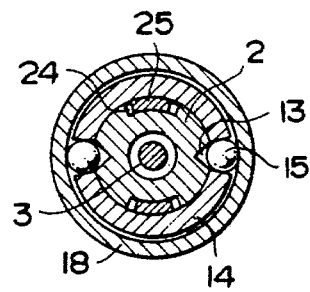
FIG. 2 is a sectional view taken along the line II—II in FIG. 1.
Figure 3:
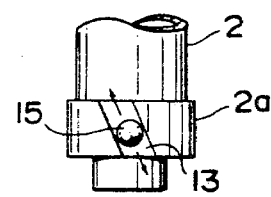
FIG. 3 shows the spiral ball groove and the ball.

The main shaft 2 has an enlarged diameter portion 2a adjacent one end thereof on the side of the pinion shaft 5, and the enlarged diameter portion 2a is provided at diametrical positions on the circumference thereof with two spiral ball grooves 13, i.e., first moving paths (Refer to FIGS. 2 and 3).

Arranged coaxially movably with the main shaft 2 and the pinion shaft 5 is a ball holding means or a sleeve 14 which is axially movable around the outer periphery of a connecting portion between the main shaft 2 and the pinion shaft 5. Coupled into diametrical positions on the circumference of the sleeve 14 are balls 15, which are fitted into the ball grooves 13. As will hereinafter be described, the balls 15 are movable in the ball grooves 13 axially of the main shaft 2 to either one of the opposite directions depending on the rotating direction of the main shaft 2.

Figure 4A:
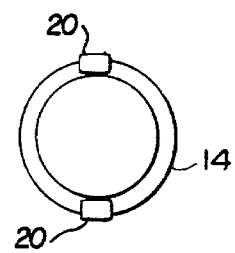
FIGS. 4A and 4B are a plan view and a front view showing the sleeve, respectively.
Figure 4B:
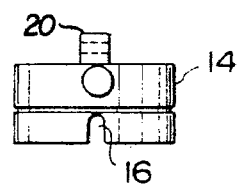

As apparent from FIGS. 1, 4A and 4B, the sleeve 14 is provided at two diametrical positions of its end portion on the side of pinion shaft 5 with axial cutouts 16, i.e., second moving paths. Pins 17 fixed on the pinion shaft 5 are inserted into the cutouts 16, whereby the sleeve 14 and the pinion shaft 5 are connected to each other in a manner that rotation can be transmitted therebetween. Consequently, the sleeve 14 cannot be rotated relative to the pinion shaft and can be only axially movable. As a result, even if the main shaft 2 and the pinion shaft 5 are rotated, the sleeve 14 cannot be rotated because of the engagement of the cutouts 16 with the pins 17, and consequently, the balls 15 slide axially in the ball grooves 13, so that the sleeve 14 can be guided by the cutouts 16 and the pins 17 to axially slide.

A ring-shaped annulus 18 is provided outwardly of the balls 15 for holding the balls 15, the inner peripheral surface of the annulus 18 is tapered off, and the inner diameter thereof at the right side is smaller than the inner diameter at the left side in FIG. 1. Furthermore, the annulus 18 is urged by a spring 19 to the left in FIG. 1. Consequently, the balls 15 are constantly urged against the groove surfaces of the ball grooves 13 by the tapered surfaces with no clearances, so that the steering responsiveness can be extremely improved.

On the other hand, pawls 20 are projectingly provided at two positions corresponding to the cutouts 16 at the other end of the sleeve 14 (to the left end in FIG. 1) as shown in FIGS. 1, 4A and 4B, and the pawls 20 are slidably coupled into peripheral grooves on the outer periphery of a valve spool 21, whereby the sleeve 14 is engaged with the spool 21 in the axial direction and is rotatable in relation with the spool 21, so that said sleeve 14 and the spool 21 constitute a valve spool mechanism for changing the oil channels.

The spool 21 is adapted to change one oil channel over to the other in the valve housing 1, for which purpose the spool 21 is arranged to by axially movable. Positioning of the oil grooves of the spool 21 and the valve housing 1 in the axial direction can be adjusted by changing the thickness of the spacer 11, and the spacer 11 is positioned by the ring 12.

Furthermore, two cutouts are formed on the circumference of the left side of the spool 21 (refer to FIG. 1), and projections 23 integrally formed on the spacer 22 are fitted in the cutouts, whereby the projections 23 prevent the spool 21 from being rotated, so that the unitary rotation of the sleeve 14 with the spool 21 can prevent the occurrence of unnecessary friction.

In addition, as shown in FIGS. 1 and 2, two cutouts 24 are formed at positions rotated through 90 degrees from the ball grooves 13 on the main shaft 2 at the right side thereof in the axial direction (as viewed in FIG. 1), and projections 25 integrally formed on the pinion shaft 5 are coupled into the cutouts 24 with a certain clearance in the circumferential direction therebetween, respectively. The provisions of the cutouts 24 and the projections 25 are intended for preventing excessive torsion of the torsion bar 3 when a torque is transmitted, and for allowing the projections to abut against the wall surfaces of the cutouts 24 to transmit a torque from the main shaft 2 to the pinion shaft 5 when manual operation is required due to troubles in the hydraulic system.

Description will hereunder be given of action of the present embodiment. In the steering operation, a reaction torque T' from the tires is transmitted to the pinion shaft 5 through the rack bar 6, and the torsion bar 3 is given a torsion commensurate to the relation torque T', whereby the main shaft 2 is rotated by a turning torque T. At this time, the sleeve 14 connected through the balls 15 to the main shaft 2 in a manner that rotation can be transmitted therebetween tends to turn in unison with the main shaft 2, but the sleeve 14 cannot freely turn because the pins 17 fixed on the pinion shaft 5 are inserted in the cutouts 16 of the sleeve 14, whereby the balls 15 slidingly move in the ball grooves 13 in the axial direction of the main shaft 2 in dependence on the rotating direction of the main shaft 2, so that the sleeve 14 is guided by said ball grooves 13 to be moved in the axial direction of the main shaft 2. The axial movement of said sleeve 14 causes the valve spool 21 connected to the sleeve 14 to move axially to block the return port 1b, so that a supply of oil which has flowed into the valve housing 1 from the pump through the pressure port 1a is prevented from flowing out into the reservoir, not shown, as indicated by an arrow B, a supply of oil is fed to either one of cylinder chambers as indicated by an arrow of either C or D to raise hydraulic pressure in the cylinder chamber, so that an auxiliary action for steering operation can be performed, thereby enabling to carry out very smooth and highly responsive steering operation. In FIG. 1, the spool 21 is in the neutral position.

Furthermore, when the main shaft 2 is rotated at a certain torque, the main shaft 2, pinion shaft 5 and sleeve 14 tend to turn unitarily, but the spool 21 cannot turn due to the stop action of the projections 23 of the spacer 22 abutting against the cutouts of the spool 21, and is moved only in the axial direction.

When the adjustment in hydraulic pressure between the right and left portions is to be made in this embodiment, the hydraulic pressure is adjusted with the spacer 11 being inspected, the thickness of the spacer 11 is chosen based on the adjustment thus made, and the chosen based on the adjustment thus made, and the adjustment in positioning the oil channel of the spool 21 and the valve housing 1 in the axial direction can be made based on the thickness of the spacer 11. Alternatively, if the pin 8 shown at the left end in FIG. 1 is inserted finally, then the spacer 11 can be omitted. More specifically, firstly, the neutral position of the hydraulic pressure is inspected without inserting the pin 8 and, if the pin 8 is inserted when the hydraulic pressure reaches the neutral condition, then the main shaft 2 and the torsion bar 3 can be assembled to each other at a desirable state of hydraulic adjustment without using the spacer 11.

As has been described above, the present invention can offer such excellent advantages that the steering responsiveness in the power steering device can be improved, the smooth change-over of oil channels with low friction can be made by use of the spool, and further, the difference in hydraulic pressure between the right and left portions is eliminated during steering, so that the adjustment to bring the hydraulic pressure to the neutral condition can be facilitated.

What is claimed is:

1. A power steering device transmitting torque of a steering wheel to wheels of an automotive vehicle utilizing fluid pressure comprising:

an input shaft coupled with said steering wheel, said input shaft having a first ball confining path means extending angularly along the shaft;

an output shaft coaxial with said input shaft;

a torsion bar connecting said input shaft with said output shaft;

a ball movable along said first ball path;

a valve spool for controlling the flow of said pressure fluid in response to movement in the axial direction, said valve spool coaxially located with said input shaft;

a ball holding means for holding said ball in said first ball path and axially movable with said ball, said ball holding means engaged at one end with said valve spool and including a first abutment member for axially retaining said ball in said first ball path, a second abutment member having a biasing means radially holding said ball under compression in said ball path, and a slot in the ball holding means for engaging a member coupled to said output shaft, said slot permitting axial movement of the ball holding means with respect to said output shaft and preventing rotational movement with respect to said output shaft, whereby when said input shaft is rotationally displaced from said output shaft, said ball holding means axially moves as said ball moves along said ball path as a result of said ball holding means being rotationally fixed and said valve spool moves axially.

2. A power steering device as set forth in claim 1, wherein said first ball path is a spiral ball groove formed on the outer periphery of said input shaft at an angle and said ball is movable along said spiral ball groove.

3. A power steering device as set forth in 1, wherein said member coupled to said output shaft is a pin on said output shaft, said pin being slidably engaged with said cutout.

4. A power steering device as set forth in claim 1, further comprising stopping means for preventing the body of said valve spool from rotating.

5. A power steering device as set forth in claim 1, wherein said second abutment is an annulus outwardly of said ball for holding said ball in said ball path.

6. A power steering device as set forth in claim 5, wherein the inner peripheral surface of said annulus is tapered.

* * * * *